United States Patent
Sun et al.

(10) Patent No.: US 9,829,728 B2
(45) Date of Patent: Nov. 28, 2017

(54) METHOD FOR FORMING MAGNETO-OPTICAL FILMS FOR INTEGRATED PHOTONIC DEVICES

(71) Applicant: MASSACHUSETTS INSTITUTE OF TECHNOLOGY, Cambridge, MA (US)

(72) Inventors: Xueyin Sun, Harbin (CN); Mehmet Cengiz Onbasli, Istanbul (TR); Caroline Anne Ross, Arlington, MA (US)

(73) Assignee: MASSACHUSETTS INSTITUTE OF TECHNOLOGY, Cambridge, MA (US)

(*) Notice: Subject to any disclaimer, the term of this patent is extended or adjusted under 35 U.S.C. 154(b) by 210 days.

(21) Appl. No.: 14/946,261

(22) Filed: Nov. 19, 2015

(65) Prior Publication Data

US 2017/0199402 A1    Jul. 13, 2017

(51) Int. Cl.
| | |
|---|---|
| G02F 1/095 | (2006.01) |
| G02B 6/132 | (2006.01) |
| G02B 6/122 | (2006.01) |
| G02B 6/12 | (2006.01) |

(52) U.S. Cl.
CPC .......... G02F 1/0955 (2013.01); G02B 6/122 (2013.01); G02B 6/132 (2013.01); G02B 2006/1208 (2013.01); G02B 2006/12061 (2013.01); G02B 2006/12109 (2013.01); G02B 2006/12121 (2013.01); G02B 2006/12123 (2013.01)

(58) Field of Classification Search
CPC ....... G02F 1/0955; G02B 6/122; G02B 6/132; G02B 2006/1208; G02B 2006/12121; G02B 2006/12061; G02B 2006/12109; G02B 2006/12123
See application file for complete search history.

(56) References Cited

U.S. PATENT DOCUMENTS

| | | | |
|---|---|---|---|
| 3,429,740 A | 2/1969 | Mee | |
| 3,573,099 A | 3/1971 | Moore et al. | |
| 4,952,014 A * | 8/1990 | Lieberman | ............. G02B 6/126 324/244.1 |
| 5,122,250 A | 6/1992 | Doormann et al. | |
| 5,426,310 A | 6/1995 | Tamada et al. | |
| 6,103,010 A | 8/2000 | Belouet | |
| 6,114,188 A * | 9/2000 | Oliver | .................... C04B 41/81 257/E21.122 |
| 6,813,077 B2 | 11/2004 | Borrelli et al. | |

(Continued)

*Primary Examiner* — John M Bedtelyon
(74) *Attorney, Agent, or Firm* — Talem IP Law, LLP

(57) ABSTRACT

Methods for forming magneto-optical films for integrated photonic devices and integrated photonic devices incorporating same are described. An optical isolator or any non-reciprocal photonic component for an integrated photonic device can be fabricated by depositing a functional garnet layer directly onto a non-garnet substrate; depositing a seed garnet layer on the functional garnet layer; and after depositing both the functional garnet layer and the seed layer performing an annealing process. Since the seed garnet layer crystalizes faster than the functional garnet layer, crystallization of the functional garnet layer can be accomplished directly on the non-garnet substrate during a single annealing step for the seed layer and the functional garnet layer.

18 Claims, 12 Drawing Sheets

(56) References Cited

U.S. PATENT DOCUMENTS

| | | | | |
|---|---|---|---|---|
| 7,006,289 B2 * | 2/2006 | Ross | ............... | G02F 1/093 |
| | | | | 359/484.03 |
| 7,995,893 B2 * | 8/2011 | Bi | ............... | G02F 1/0036 |
| | | | | 257/E27.006 |
| 8,254,745 B2 | 8/2012 | Nakada et al. | | |
| 8,306,371 B2 | 11/2012 | Yokoi | | |
| 8,335,407 B2 * | 12/2012 | Yokoi | ............... | G02B 6/132 |
| | | | | 385/14 |
| 8,396,337 B2 | 3/2013 | Kroemer et al. | | |
| 8,749,871 B2 | 6/2014 | Montoya et al. | | |
| 8,837,877 B2 | 9/2014 | Kimerling et al. | | |
| 2010/0238536 A1 * | 9/2010 | Hu | ............... | G02B 6/12007 |
| | | | | 359/280 |

* cited by examiner

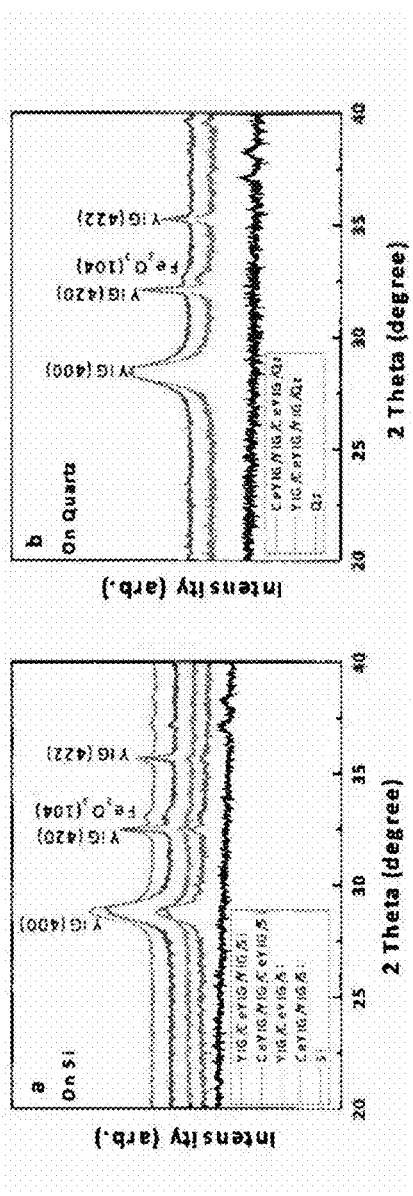
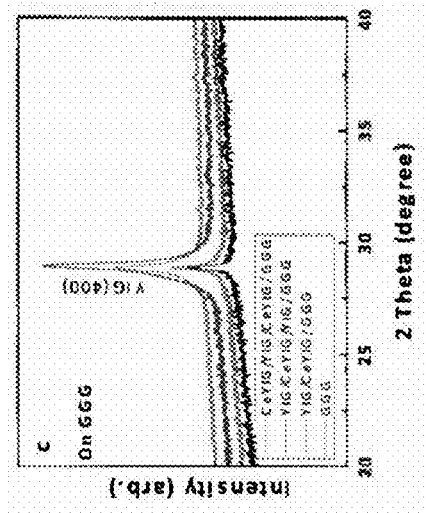
FIG. 8A
FIG. 8B
FIG. 8C

METHOD FOR FORMING MAGNETO-OPTICAL FILMS FOR INTEGRATED PHOTONIC DEVICES

This invention was made with Government support under Contract No. HR0011-13-3-0002 awarded by the Defense Advanced Research Projects Agency and under Grant No. ECCS 1231348 awarded by the National Science Foundation. The Government has certain rights in the invention.

BACKGROUND

Photonic integrated circuits (photonic ICs) are devices that integrate multiple optical components onto a single chip, similar to electronic integrated circuits. Integrating multiple optical components onto the same chip is desirable because the integration facilitates more efficient processing compared to discrete components. Primary applications of photonic ICs include optical communications, though applications in other fields such as optical computing are also of interest. Optical components that may be integrated as part of photonic ICs include, but are not limited to, lasers, waveguides, photodetectors, modulators, and optical isolators. Recent developments have been made directed to integration of optical components onto a silicon substrate. However, the materials forming current optical isolators tend to not bond well with silicon, driving research into new fabrication techniques for the integration of optical isolators onto silicon substrates.

BRIEF SUMMARY

Methods for forming magneto-optical films for integrated photonic devices and the photonic integrated circuits incorporating same are described herein.

A method of fabricating integrated photonic devices, such as optical isolators, can include depositing a functional garnet layer directly onto a non-garnet substrate, depositing a seed garnet layer on the functional garnet layer, and after depositing both the functional garnet layer and the seed garnet layer, performing an annealing process. The material of the seed garnet layer is selected so as to have a characteristic in that it crystalizes faster than the functional garnet layer. Instead of being applied to the non-garnet substrate surface, annealed and then used to facilitate deposition of a functional garnet layer, the seed garnet layer drives crystallization of a functional garnet layer in a top-down approach so that the functional garnet layer can be selected for its magnetooptical properties.

In some implementations, a second functional garnet layer can be deposited on the seed garnet layer before performing the annealing step. In some further implementations, alternating layers of seed garnet and functional garnet can be deposited so as to achieve a desired total thickness for the functional garnet while providing sufficient crystallization support through use of an interspersed seed garnet layer during a single annealing step for the alternating layers of functional garnet and seed garnet.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 5A is a perspective view, FIG. 5B is a top view, and FIG. 5C is a side view.

FIGS. 8A-8C show results of X-ray diffraction (XRD) scans conducted after fabricating the experimental examples. FIG. 8A shows the plots for the silicon substrate examples, FIG. 8B shows the plots for the quartz substrate examples, and FIG. 8C shows the plots for the single crystal GGG (100) substrate examples.

DETAILED DISCLOSURE

Methods for forming magneto-optical films for integrated photonic devices, including optical isolators, and the photonic integrated circuits incorporating same are described herein.

Optical isolators are generally formed by transparent magnetic materials that are deposited onto a substrate. Garnets are a popular transparent magnetic material for high performance applications. Garnets grow well with garnet substrates, but not as well with other substrates such as silicon.

The techniques described herein are suitable for integrating optical isolators with non-garnet substrates, as desired in modern photonic ICs. The techniques described herein also provide a more simplified approach to fabrication, thus making integration with other optical components easier. In addition, in certain implementations, the techniques described herein can result in a reduction of fabrication steps as compared to certain prior fabrication techniques and subsequently, manufacturing cost. In certain implementations, the described techniques can result in improved performance and efficiency for optical isolators on silicon substrates.

Figure 1A:
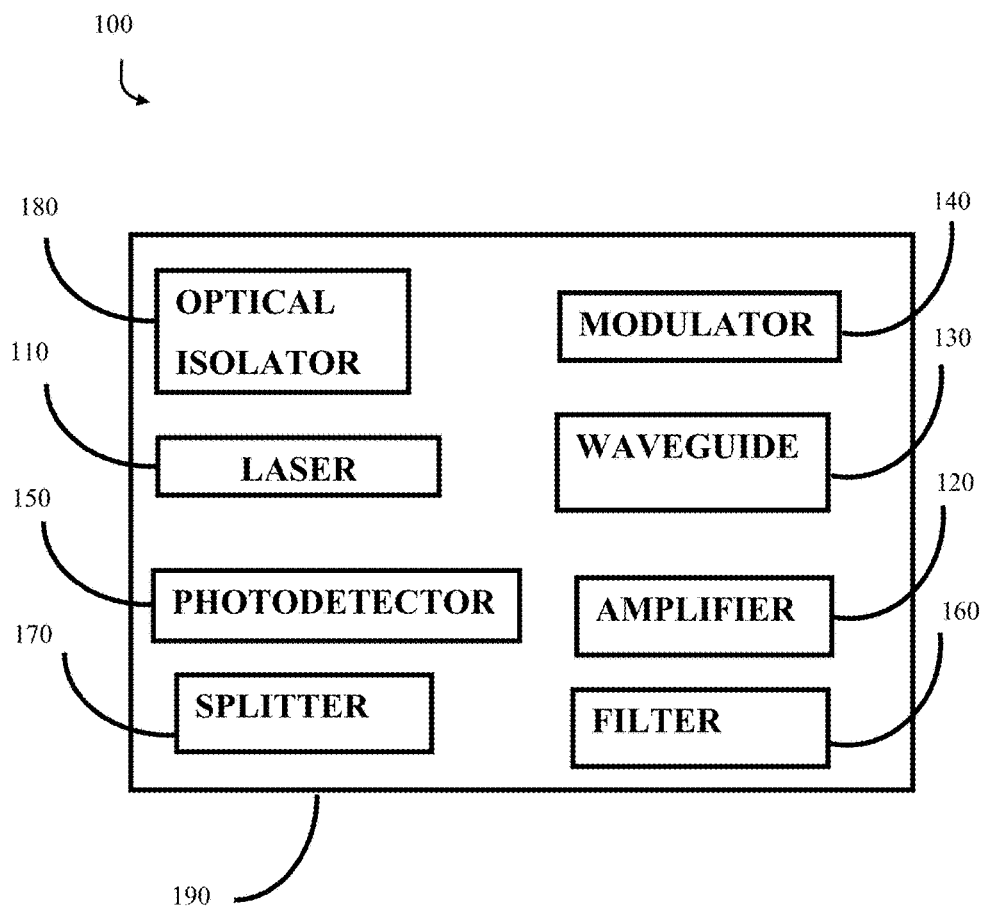
FIG. 1A shows a diagram of a photonic IC that may include devices fabricated as described herein.

Photonic ICs are made from different components formed on a substrate, analogous to electronic integrated circuits such as microprocessors or memory chips on silicon substrates. FIG. 1A shows a diagram of a photonic IC that may include devices fabricated as described herein. Referring to FIG. 1A, a photonic IC 100 can include a variety of components such as, but not limited to, a laser 110, an optical amplifier 120, waveguides 130, a modulator 140, a photodetector 150, a filter 160, a splitter 170, an optical isolator 180, and combinations and/or multiples thereof on a substrate 190. A coupler (not shown) may also be included.

The laser 110, in the broadest sense, is a device that emits light. The optical amplifier 120 can be used to amplify the light emitted by the laser 110, and the waveguide 130 guides the light, which may be amplified by the optical amplifier 120. The modulator 140 can be used to modulate the light emitted through the waveguide 130. The photodetector 150 can be used to detect the light emitted from the laser 110 on the photonic IC 100 or from a laser from another device communicating with the photonic IC 100. One or more filters 160 can be used to selectively transmit light of different wavelengths, and the splitter 170 enables selected light to be directed in different pathways. For example, light, generated from the laser 110 or from an external component, can propagate via the waveguide 130 (which may be in the form of an optical fiber or other suitable waveguide structure) and be split, using the splitter 170, into various channels for data processing. The splitter 170 may create additional channels or may combine multiple channels into fewer channels (supported by one or more corresponding waveguides).

The optical isolator 180 controls the flow (direction) of light and is generally coupled to the laser 110 and/or the waveguide 130. For example, the optical isolator 110 can be coupled to the output of the laser 110 to direct the light from the laser 110 to the waveguide 130, which allows the light to propagate to a receiving component 195, which may be any suitable photonic or electronic component that is to receive the signal (and which may be used to direct the signal to another component). Additional implementation examples are shown in FIGS. 5A-5C and 6.

In the photonic IC 100, the optical isolator 180 provides a diode-type component to protect the laser 110 from reflected light. This is accomplished because the optical isolator 180 controls the flow of light through the waveguide 130 in one direction but not in the reverse direction. The substrate 190 may be a silicon-based substrate, for example, a substrate on which electronic integrated circuits are fabricated.

In some embodiments, optical components of a photonic IC such as described with respect to FIG. 1A may be integrated with electronic integrated circuits in a system on a chip (SOC) configuration. SOCs are integrated circuits that integrate components of a computer or other electronic or photonic system onto a single chip (or as stacked chips in certain forms of 3D ICs). Components such as processors, memory, timers, and physical interfaces may be contained on the chip. As the computing power and quantity of transistors on SOCs increases, traditional electronic interconnections between components on the SOC may no longer be able to satisfy the low-power consumption requirements for these new computing applications. Optical interconnections may be able to provide a suitable alternative. SOC design using optical interconnections can be two-dimensional (on a same plane) or three-dimensional (between vertical layers of a 3D SOC). In some of such cases, waveguides can be used to propagate optical signals, generated by lasers and directed by optical isolators, between components of the SOC.

To enable photonic ICs (and even SOCs with electronic and photonic ICs or a combination of electronic IC and photonic components) with integrated photonic devices, devices such as optical isolators should be fabricated on Si, Ge, or group III-V substrates.

An optical isolator design makes use of transparent magnetic materials to enable the one way transmission of light. In general, the higher the material figure of merit (FoM) for the transparent magnetic material, the better the performance capabilities of the optical device (e.g., optical isolator) in which the transparent magnetic material is used. The FoM of a particular material is given by the Faraday rotation of the particular material divided by the optical absorption of that particular material at the relevant wavelength (typically ~1550 nm for optical communications). Faraday rotation is a magneto-optical phenomenon characterized as interaction between light and a magnetic field in a medium and is measured by how much a material rotates the plane of polarization of light.

One of the most useful of the transparent magnetic materials (e.g., the materials having the highest FoM) are garnets. Garnets include crystal structures with a general formula of $A_3B_2(CO_4)_3$ or $A_3B_5O_{12}$, where A, B, and C are chemical elements (and B and C may be implemented with a same element; hence the second listed general formula). One garnet of interest for its opto-magnetic properties is yttrium iron garnet (YIG), which has yttrium in the A site and iron in the B site of the general formula $A_3B_5O_{12}$ (as $Y_3Fe_5O_{12}$).

It is also possible to substitute some of the yttrium with another rare earth element and it is possible to substitute one or both of the iron sites (e.g., the $Fe_2$ or the $Fe_3$) with Ga, Al, or certain transition metals to obtain various properties. For example, rare-earth substituted garnets, including, but not limited to, $(Bi,Y)_3Fe_5O_{12}$ (referred to as Bi:YIG) and $(Ce,Y)_3Fe_5O_{12}$ (referred to as Ce:YIG), have been shown to have a high material FoM compared to other rare-earth garnets, such as YIG and yttrium aluminum garnet (YAG).

As mentioned above, for fabricating an optical isolator of a photonic IC, the transparent magnetic material should be able to be formed on a waveguide that is likely made up of silicon (or other group IV or even group III-V semiconductor). In general, garnets can be grown epitaxially on substrates of other garnets such as GGG ($Gd_3Ga_5O_{12}$). However, it can be challenging to grow garnet on non-garnet substrates due to garnet's complex cubic unit cells with lattice parameters and CTE (coefficient of thermal expansion) much larger than non-garnet substrate materials such as silicon and other semiconductors such as group III-V semiconductors of GaAs and InP). Prior research has shown that YIG films can be annealed on non-garnet substrates, such as silicon, to produce the desired crystallization of the garnet structure (likely due to YIG's thermodynamically stable phase). However, as mentioned above, rare-earth substituted garnets show better FoMs than YIG and other rare-earth garnets and are therefore desirable as the functional material in an integrated photonic device such as an optical isolator. Although polycrystalline garnets such as the rare-earth substituted garnets have been shown to grow well on other garnets, direct growth on non-garnet substrates has been a challenge.

Figure 1B:
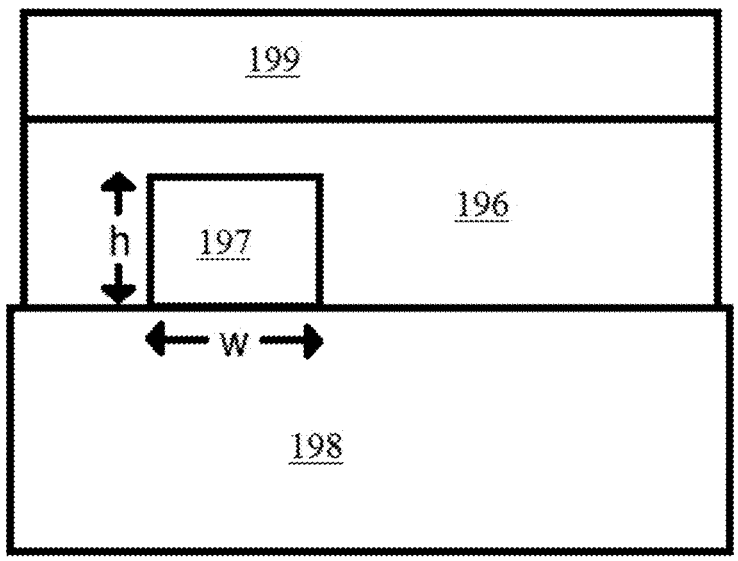
FIG. 1B shows an example configuration of a magneto-optical film for a photonic IC.

FIG. 1B shows an example configuration of a magneto-optical film for a photonic IC. A functional film 196, such as (but not limited to) Ce:YIG, can be formed on an optical device 197 (such as a laser, a detector and/or other active component and/or waveguide) on a substrate 198. Film 196 can be a multilayer structure where an inert oxide cladding can be at the lower layer with a height the same as or slightly lower than that of the device 197. The upper layer in film 196 can then be formed of the Ce:YIG. A seed, or templating layer 199, such as (but not limited to) YIG, can be on the functional film 196. The optical device 197 may have a width (w) between 400 nm-1 cm and a height (h) between 100 nm-500 nm. The substrate 198 may be formed of a material that melts at a temperature T>1200° C.

Figure 2:
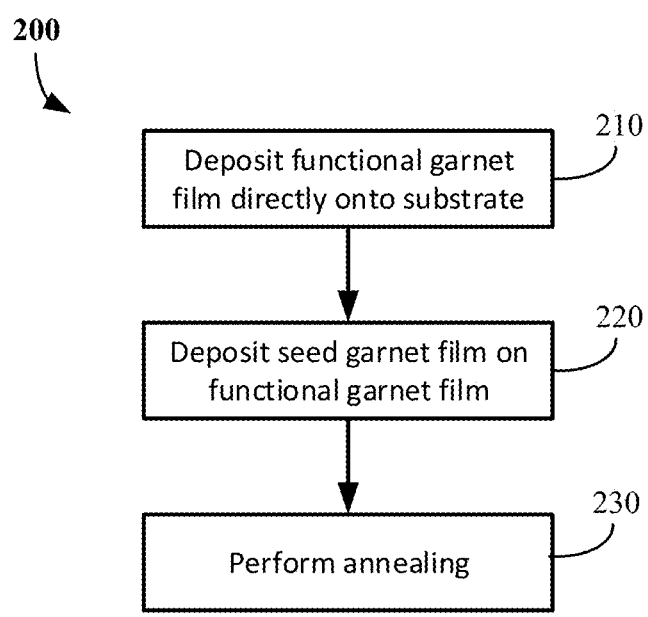
FIG. 2 illustrates a process flow for forming magneto-optical films for integrated photonic devices.

FIG. 2 illustrates a process flow for forming magneto-optical films for integrated photonic devices. Process 200 is suitable for optical isolator fabrication on a non-garnet substrate. Referring to FIG. 2, a layer of functional garnet film is deposited directly onto a substrate prepared for fabrication (210). When fabricating an optical isolator, the substrate can include a waveguide on which the functional garnet film is deposited. The waveguide can have any suitable topology for implementing a particular photonic IC. As some examples, the waveguide can be formed of photonic crystals, a two-dimensional planar thin film, or optical fiber. In some cases, the waveguide can be formed via patterning of a silicon-based substrate and/or include a silicon based core/cladding. Of course, it is often preferable to simplify waveguide patterns to minimize the number of sharp edges, corners, and small bendings to avoid stress concentrations.

The substrate (and/or waveguide) can be silicon, a silicon oxide, a silicon nitride, or other group IV or group III-V material. In some cases, the substrate can be any suitable material that does not melt during the deposition or annealing processes. For example, silicon waveguides with more sophisticated patterns can be used with garnets for isolators as long as the thermal cycling does not increase the loss of the waveguides too much or crack those waveguides altogether. The functional garnet film can be any suitable garnet selected for its opto-magnetic properties, particularly its FoM. Indeed, the functional garnet film can even be a rare-earth substituted garnet such as Ce:YIG or Bi:YIG among other garnets that can be selected for optimal FoMs. The thickness of the thin film of functional garnet may be from about 30 nm to about 1 μm.

The functional garnet film is not annealed following deposition. Instead, a layer of a "seed" garnet film is deposited directly onto the functional garnet (220). The functional garnet film may be deposited by a variety of methods including, but not limited to, physical layer deposition (PLD) (e.g., pulsed-laser deposition), chemical vapor deposition (CVD), liquid phase epitaxy (LPE) and sputtering. Similarly, the seed garnet film may be deposited by a variety of methods including, but not limited to, PLD, CVD, LPE and sputtering. The same or different type of deposition process may be used for the two films depending on the selected materials and other manufacturing considerations. In some cases, the total thickness of the deposited functional garnet and seed garnet is between 30 nm and 1 μm.

It is only after the deposition of at least the functional garnet film and the seed garnet film that the structure is annealed (230). The annealing process (230) can be one or more rapid thermal annealing (RTA) processes. For example, a single RTA step may be sufficient for certain materials and/or thicknesses, while multiple RTA steps may be used to ensure appropriate crystallinity in some implementations. As an alternative, the annealing process (230) can be a laser annealing process for selective area crystallization.

Even though both the functional garnet film and the seed garnet film are annealed at the same time, the seed garnet crystallizes before the functional garnet and provides a template for the growth of the functional garnet. The RTA process can be optimized by temperature to achieve the highest quality crystallization for the seed garnet to crystallize first and drive the functional garnet crystallization (e.g., under conditions for appropriate crystallization). The garnet film providing the "seed" layer refers to a garnet material that can crystalize faster than the functional layer. For example, YIG crystalizes faster than Ce:YIG and therefore YIG could be used as a seed layer for a functional layer of Ce:YIG. The thickness of the "seed" garnet film can be selected/optimized, in some cases, for its ability to template the crystallization over the entire thickness of the functional garnet within other parameters or constraints of the process.

Figure 3:
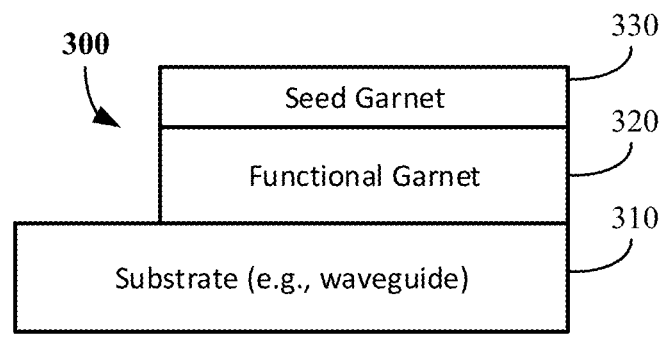
FIG. 3 illustrates an optical isolator structure that can be achieved through the techniques described herein.

FIG. 3 illustrates an optical isolator structure that can be achieved through the techniques described herein. Referring to FIG. 3, an optical isolator 300 can be fabricated on a substrate 310 with a structure of a functional garnet layer 320 directly contacting the substrate 310 (which may be a waveguide structure formed, for example, of a silicon-based material such as quartz), and a seed garnet layer 330 on top of the functional garnet layer 320. As mentioned above, the functional garnet layer is a garnet material having optimal FoM and the seed garnet layer is selected based on the material of the functional garnet layer.

In some cases, a thicker device is desired than can be formed within processing constraints of the annealing process of the single seed garnet film and the single functional garnet. As mentioned above, one mechanism for forming a functional garnet of appropriate thickness is to deposit alternating layers of functional garnet and seed garnet, ending on either a functional garnet layer or a seed garnet layer, before performing the annealing process. One example of this structure is shown in FIG. 4.

Figure 4:
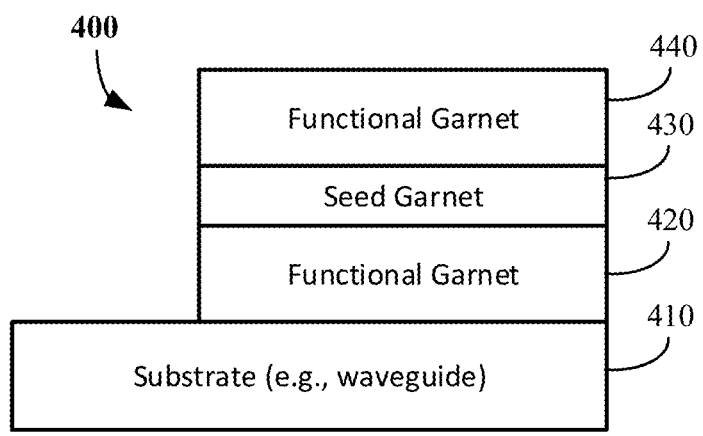
FIG. 4 illustrates another optical isolator structure that can be achieved through the techniques described herein.

FIG. 4 illustrates another optical isolator structure that can be achieved through the techniques described herein. Referring to FIG. 4, an optical isolator 400 can be fabricated on a substrate 410 with a structure including multiple layers of functional garnet to achieve a desired total thickness. For example, a first functional garnet layer 420 can be disposed directly on the substrate 410 (which may be a waveguide structure formed, for example of a silicon-based material such as quartz). A seed garnet layer 430 is disposed between the first functional garnet layer 420 and a second functional garnet layer 440 to provide a trilayer stack. Of course, additional layers of seed garnet and functional garnet can be disposed above the second functional garnet layer 440 in some implementations.

Advantageously, the material for the functional garnet film can be selected for its FoM (for proper function and performance of the photonic device) as opposed to its ability to be annealed directly on a non-garnet substrate. Previous studies have shown that rare-earth substituted garnets grown on a non-garnet substrate do not form the appropriate crystal structure when annealed. In particular, Ce:YIG grown on Si was shown to form undesirable mixtures of oxide phases such as $CeO_2$ and iron oxides when annealed. In addition, although rare-earth substituted garnets such as Ce:YIG can be grown on crystalized YIG (that was deposited on an Si substrate and annealed), the performance of such a device is degraded due to the YIG interface between Ce:YIG and the underlying Si substrate.

Advantageously, by including the seed garnet film and performing the annealing process after both the functional garnet film and the seed garnet film are deposited, rare-earth substituted garnets, when selected as the functional garnet film, can achieve useful properties.

In the provided experimental examples, transmission electron microscopy shows that a seed garnet layer facilitates crystallization of a functional garnet—between the seed garnet layer and the substrate—during in situ annealing. This single annealing step results in a reduced thermal budget and simplified fabrication process. The reduced thermal budget supports on-chip device integration and provides an advantage over previous integration attempts.

Another advantage to the seed layer being formed above the functional layer is that the seed layer can inhibit evaporation of functional garnet materials that may be more volatile due to substitutions. For example, when a bismuth-substituted garnet is used as the functional garnet layer, the bismuth tends to be highly volatile and evaporates from the film easily when there is no capping layer. Since the seed garnet film would be deposited on the bismuth-substituted garnet before annealing, a capping layer is not needed since the seed layer also provides the capping properties by inhibiting evaporation of the layer below.

Traditionally, seed layers are grown before the active, or functional, layer in order to guide the growth of the active layer. As shown in the experimental examples below, it was found that certain garnet materials can promote functional garnet crystallization even when deposited above the functional garnet, enabling functional garnet to be grown directly on a waveguide. The direct contact between the functional garnet and the waveguide (which may be formed of silicon or other semiconductor material) maximizes the garnet's interaction with the guided light without the spacing loss caused by a weakly magneto-optical garnet under layer or the defects that occur when crystalizing the (functional) garnet without the seed over layer.

The top-down crystallization of the functional garnet provides enhanced design options for non-reciprocal optical devices, and may be applicable in other materials systems where a seed layer is needed to crystallize a functional layer.

Figure 5A:
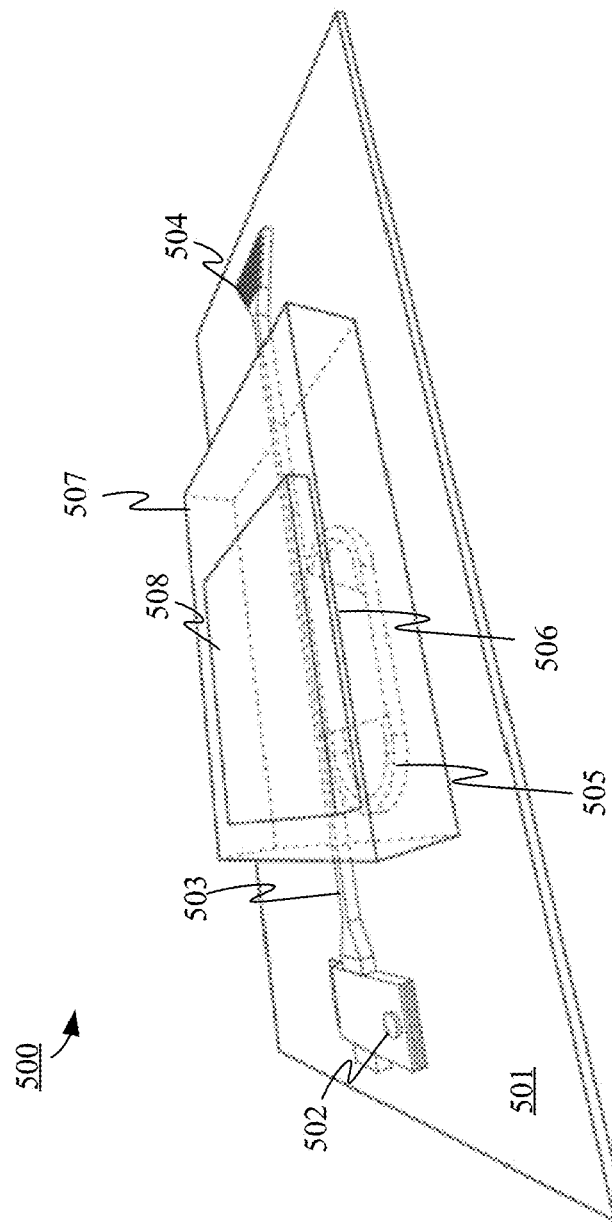
FIGS. 5A-5C illustrate an example laser integrated waveguide isolator that may be fabricated using techniques described herein.
Figure 5B:
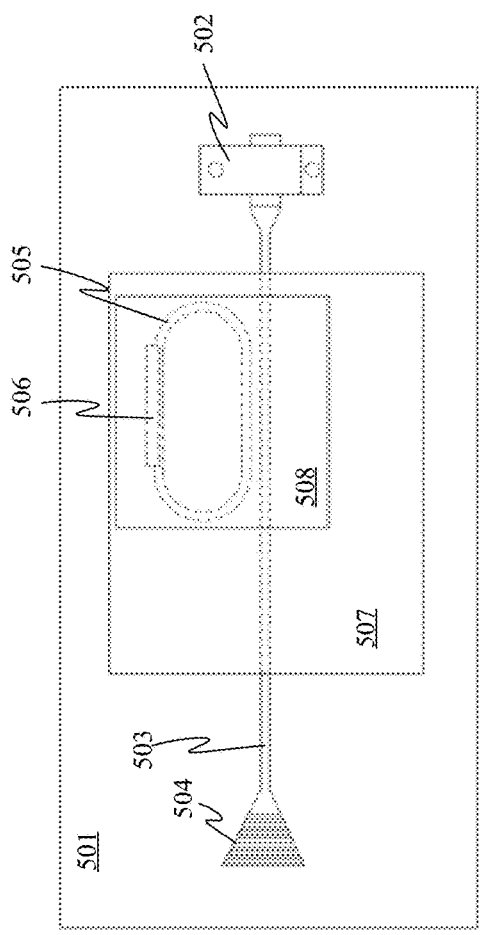
Figure 5C:
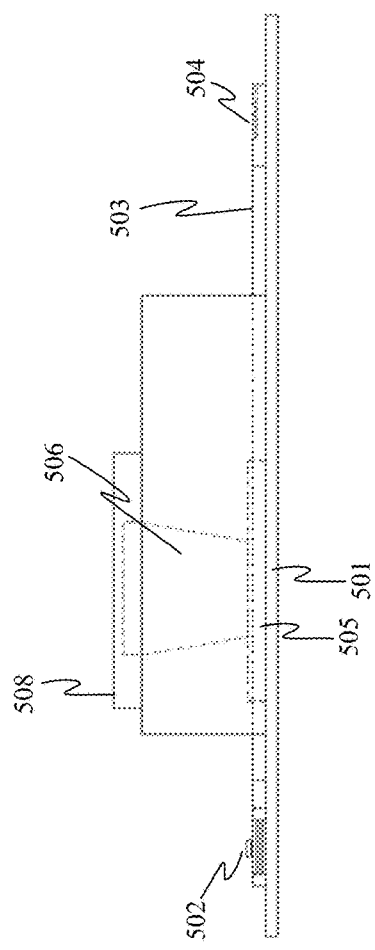
Figure 6:
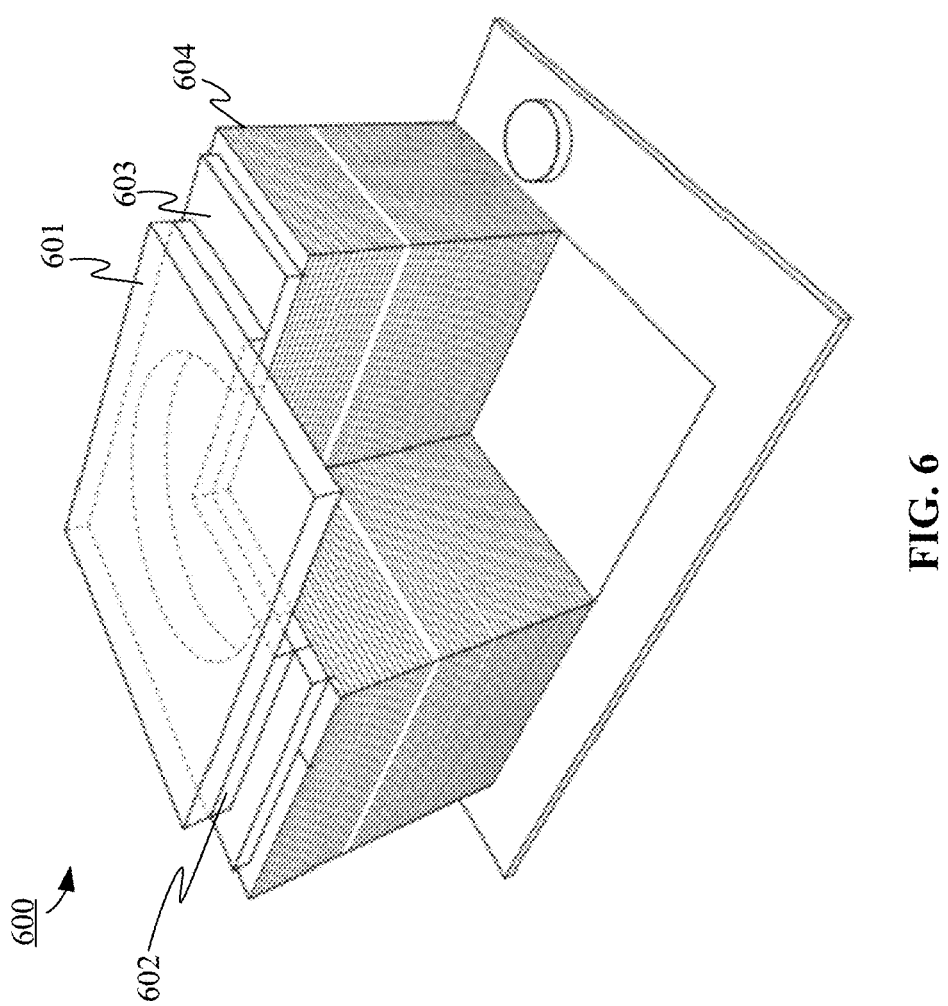
FIG. 6 illustrates an example vertical laser integrated waveguide isolator that may be fabricated using techniques described herein.

FIGS. 5A-5C illustrate an example laser integrated waveguide isolator that may be fabricated using techniques described herein; and FIG. 6 illustrates an example vertical laser integrated waveguide isolator that may be fabricated using techniques described herein.

As shown in FIGS. 5A-5C a photonic IC 500 including a laser integrated waveguide isolator has, on a single substrate 501, a laser 502 connected to a waveguide 503, which has at its other end a grating coupler 504 providing an outcoupler for a fiber. A race track resonator 505 can be formed with a functional garnet/seed layer arm 506 extending, within a cladding 507, from the resonator 505 to an isolator 508. As an example implementation, the substrate 501 may be a silicon-on-insulator substrate, the race track resonator 505 can be formed of a silicon waveguide, the arm 506 can be formed of a Ce:YIG magneto-optical functional garnet layer on the silicon waveguide and a YIG seed layer (providing the crystalizing template layer) on the Ce:YIG, and the cladding 507 can be formed of silicon oxide.

In this horizontal on-chip integration of laser and waveguide isolator, the garnet layer can be formed on or under the waveguide. In some cases, the garnet may even be patterned to be the waveguide itself, depending on the application mode.

In the vertical structure shown in FIG. 6, a photonic IC 600 can include a seed layer 601 on a functional garnet layer 602. The functional layer 602 can be formed within a circular hole of a contact pad 603, which is on a laser structure 604 for vertical light emission. In this vertical integration, the garnet-based isolator can be integrated on a vertical-cavity surface-emitting laser (VCSEL), which emits a beam in the vertical direction. Although not shown, the vertical beam can then be coupled via a grating coupler onto a waveguide deposited/patterned on an upper layer.

Experimental Examples

Figure 7:
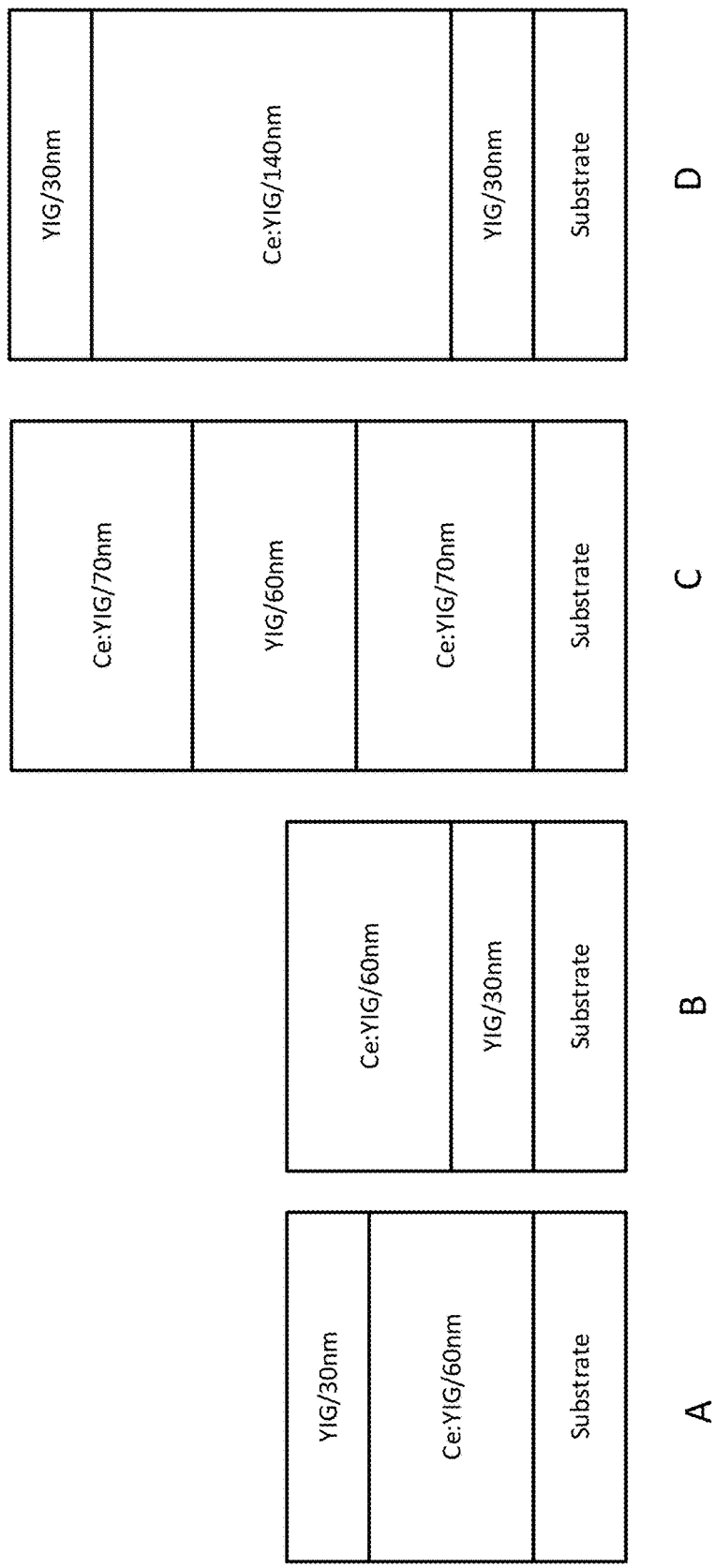
FIG. 7 shows the layer structures A, B, C, and D of experimental examples illustrating the effectiveness of the described techniques.

FIG. 7 shows the layer structures A, B, C, and D of experimental examples illustrating the effectiveness of the described techniques. For the experiments, Ce:YIG and YIG films with layer structures A, B, C, and D as depicted in FIG. 7 were deposited and then annealed on three different substrates: (001) silicon, Z-cut (0001) quartz, and (100) GGG. Also fabricated were the structures formed on a silicon-on-insulator waveguide (see FIG. 12). Layer structures A and B represent two-layer garnet films with 90 nm total thickness, structure A having the Ce:YIG on the substrate with the YIG as an overlayer (such as the structure shown in FIG. 3) and structure B having the YIG on the substrate under the Ce:YIG. Layer structures C and D represent three-layer garnet films with 200 nm thickness. Structure C has a structure similar to that shown in FIG. 4 with two Ce:YIG layers separated by YIG. Structure D sandwiches the Ce:YIG between two YIG layers.

The magneto-optical film growth for the YIG and Ce:YIG layers was carried out using PLD with YIG and Ce:YIG targets. During deposition, the appropriate target was ablated by a KrF excimer laser at a wavelength of 248 nm, 10 Hz repetition rate, and a fluence of 2 J cm$^{-2}$. The substrate temperature was held at 650° C. throughout the deposition. The distance between the substrate and the targets was 6 cm. The chamber was pumped to $5\times10^{-6}$ Torr base pressure for PLD. During the PLD for YIG and Ce:YIG growth, the oxygen pressure was maintained at 25 mTorr. After deposition, the samples were kept at 650° C. for 15 min at 500 Torr oxygen pressure, and then cooled to 200° C. at a ramping rate of 5° C. min$^{-1}$ under 500 Torr oxygen pressure. The films were subsequently ex situ rapid thermal annealed (Modular Process Tech, RTP-600S) at 800° C. for 5 min.

Phase identification and texture analysis were carried out on the fabricated examples using X-ray diffraction (XRD). In particular, conventional 2ω-θ Bragg diffraction data were collected on a PANalytical X'pert Pro MPD diffractometer. The thickness was measured by surface profilometry on a KLA-Tencor P-16+ stylus profiler with a measurement error of less than 5%. Samples for transmission electron microscopy (TEM) were prepared using focused ion beam (FEI-600), and then imaged on a JEOL 201 OF field emission TEM at 200 kV acceleration voltage. The element distribution in the sample was mapped by STEM EDX. Magnetic properties were characterized at room temperature by vibrating sample magnetometry (VSM) using an ADE Technologies VSM Model 1660.

Figure 9:
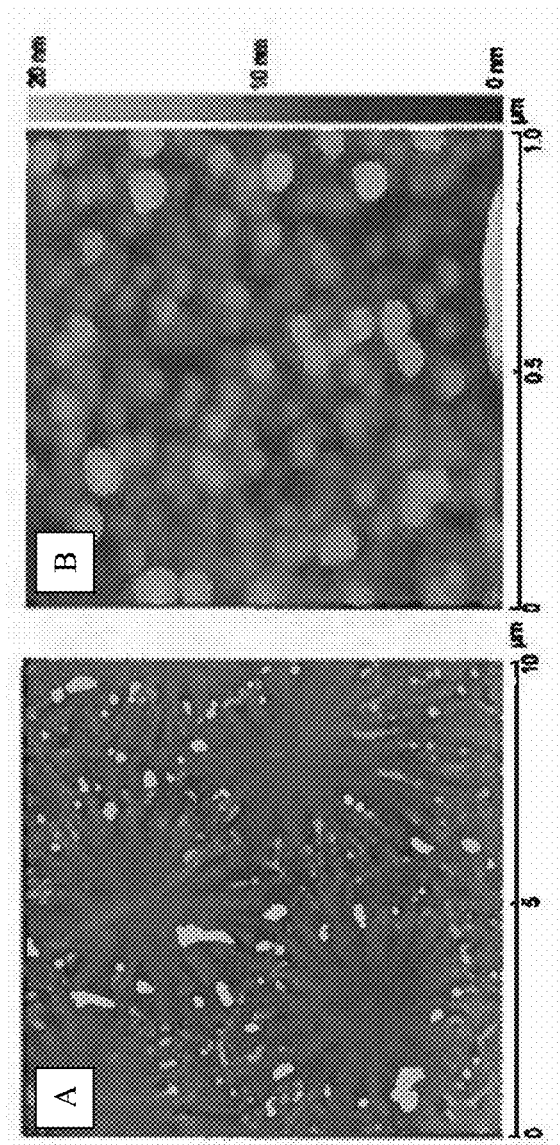
FIG. 9 shows atomic force microscopy (AFM) images from two of the fabricated experimental examples; image A is of the A structure (shown in FIG. 7) on the Si substrate (10 μm×10 μm area) and image B is of the B structure (shown in FIG. 7) on the Si substrate (1 μm×1 μm area).

FIGS. 8A-8C show results of X-ray diffraction (XRD) scans conducted after fabricating the experimental examples. FIG. 8A shows the plots for the silicon substrate examples, FIG. 8B shows the plots for the quartz substrate examples, and FIG. 8C shows the plots for the single crystal GGG (100) substrate examples. FIG. 9 shows atomic force microscopy (AFM) images from two of the fabricated experimental examples; image A is of the A structure (shown in FIG. 7) on the Si substrate (10 μm×10 μm area) and image B is of the B structure (shown in FIG. 7) on the Si substrate (1 μm×1 μm area).

As can be seen in FIGS. 8A and 8B, the YIG (400) peak exhibited the highest intensity in all samples, which indicated that the film had a preferred (100) texture based on the Powder Diffraction File, in which YIG (420) has the highest intensity.

The out-of-plane lattice constant of the films was 12.39 Å, similar to that of YIG films (12.38 Å). The weak peak at 33.1°±0.05° for films on Si and Qz was attributed to hematite, $\alpha\text{-Fe}_2\text{O}_3$, an antiferromagnet. In contrast, as shown in FIG. 8C, the XRD results for the films grown on GGG after RTA indicate an epitaxial single-crystal film for all layer sequences with no secondary phases.

Turning to FIG. 9, for the YIG. Ce:YIG Si shown in A, the grain size at the top surface was up to 5 μm, and the grains showed a radiating pattern, while for the Ce:YIG/YIG Si shown in B, dense topographic features up to ~50 nm across were visible. Although not part of the described experiments, Ce:YIG films grown on a YIG seed layer on $Si_3N_4$ using the two-step deposition process also showed grains with a radiating pattern at least a few microns across, and large grains have also been seen in single layer YIG grown on other substrates such as diamond.

FIGS. 10A-10G illustrate transmission electron microscopy (TEM) images and element mapping of films on silicon substrates. After RTA, transmission spectra of the optical isolators of structures A and B on silicon substrates were analyzed on a Newport Auto Align workstation coupled with an optical vector analyzer (LTJNA Technologies OVA-5000). Near-infrared laser light was coupled in and out of the chip through tapered lens-tip fibers. During the measurement, a permanent magnet was placed by the side of sample to produce ~1000 Oe magnetic field in-plane and perpendicular to the racetrack waveguide section in the window region. Optical isolation performance of the device was tested by reversing the magnetic field direction while maintaining the same light propagation direction, which is equivalent to reversing the light propagation direction. In order to mitigate the effect of temperature fluctuations which can lead to spurious resonance shift, the transmission measurement was repeated multiple times with the magnetic field directions reversed. The interval between each measurement is about two minutes.

Figures 10A, 10B:
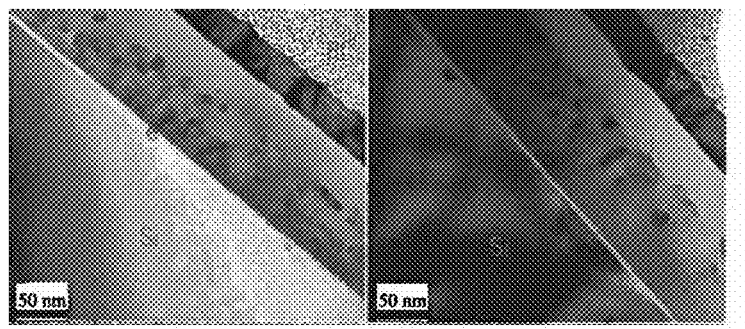
FIGS. 10A-10G illustrate transmission electron microscopy (TEM) images and element mapping of films on silicon substrates.
Figures 10C, 10D:
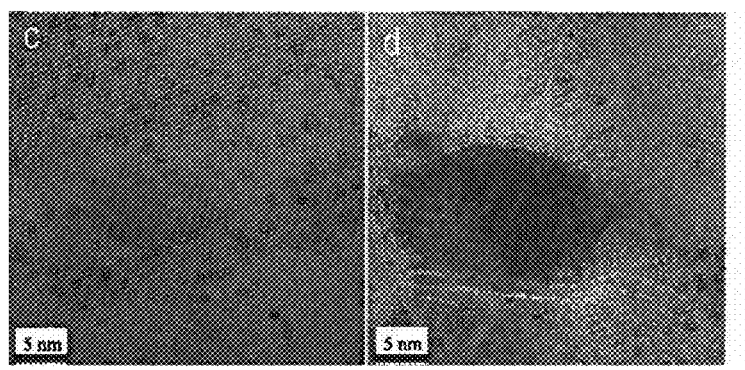
Figures 10E, 10F:
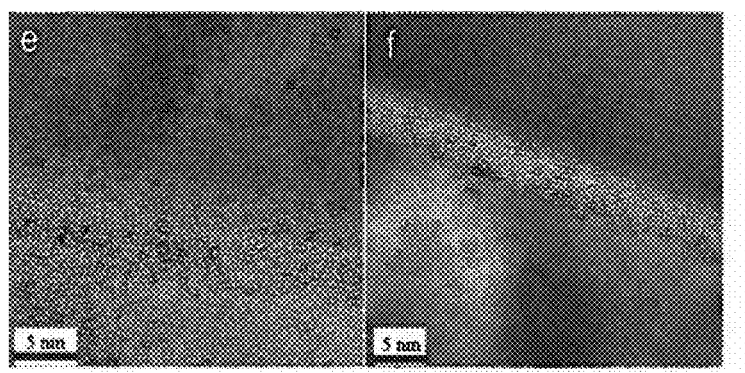
Figure 10G:
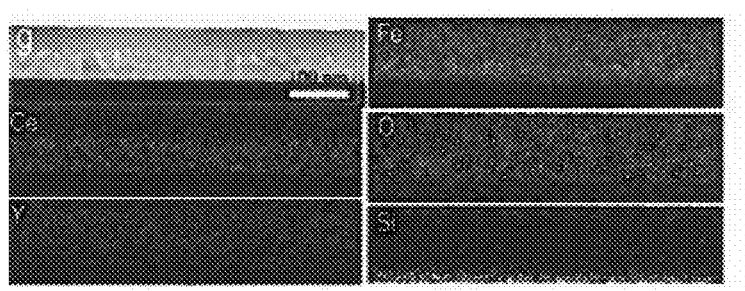

As can be seen in FIGS. 10A and 10B, which respectively show structure A of FIG. 7 (YIG(30 nm)/Ce:YIG(60 nm)/Si) and YIG(30 nm)/Ce:YIG(60 nm)/YIG(30 nm)/Si (which is similar to structure B but with an additional YIG layer), the grain size in the Ce:YIG layer was less than 20 nm, but the YIG layer consisted of much larger grains, larger than the field of view. High resolution (HR) TEM images of the interface between the YIG layer and the Ce:YIG layer for these two structures are shown in FIGS. 10C and 10D, respectively. The orientation of the large YIG grains was (100), while the orientations of the small grains in the Ce:YIG layer varied. FIG. 10E shows a HRTEM image of the interface between film and substrate (silicon with native oxide) for YIG/Ce:YIG/Si. The Ce:YIG layer in contact with the amorphous SiOx was crystalline, with an ~1 nm thick layer of amorphous Ce:YIG at the interface. In contrast, in the YIG/Ce:YIG/YIG/Si sample shown in FIG. 10F, the YIG in contact with the SiOx was a large fully crystallized grain with (100) orientation. FIG. 10G provides an element distribution map of the YIG/Ce:YIG/Si, which illustrates uniform distribution of Y throughout the layers and localization of Ce in the Ce:YIG layer as anticipated. Fe, however, showed a less uniform distribution in the Ce:YIG layer than in the YIG.

Growing a Ce:YIG film and annealing under the same conditions (but without the YIG layer) did not yield garnet-structured films on non-garnet substrates. Prior work also showed that in the absence of the YIG layer, crystallization of the Ce:YIG layer is impeded. The present results extend this result to show that the templating effect of YIG on Ce:YIG growth exists even if both layers are simultaneously crystallized. The YIG is assumed to crystallize first, providing a large-grained layer that promotes crystallization of Ce:YIG, even if the YIG is placed on top of the Ce:YIG.

Magnetic properties of Ce:YIG films were measured with magnetic fields applied in the film plane (IP) or perpendicular to the film plane (out-of-plane, OP) at room temperature using a vibrating sample magnetometer (VSM). The hysteresis loops at room temperature are given in FIG. 11 plots a-f FIG. 11 shows plots of experimental magnetic properties of the magneto-optical films on the various substrates.

Figure 11:
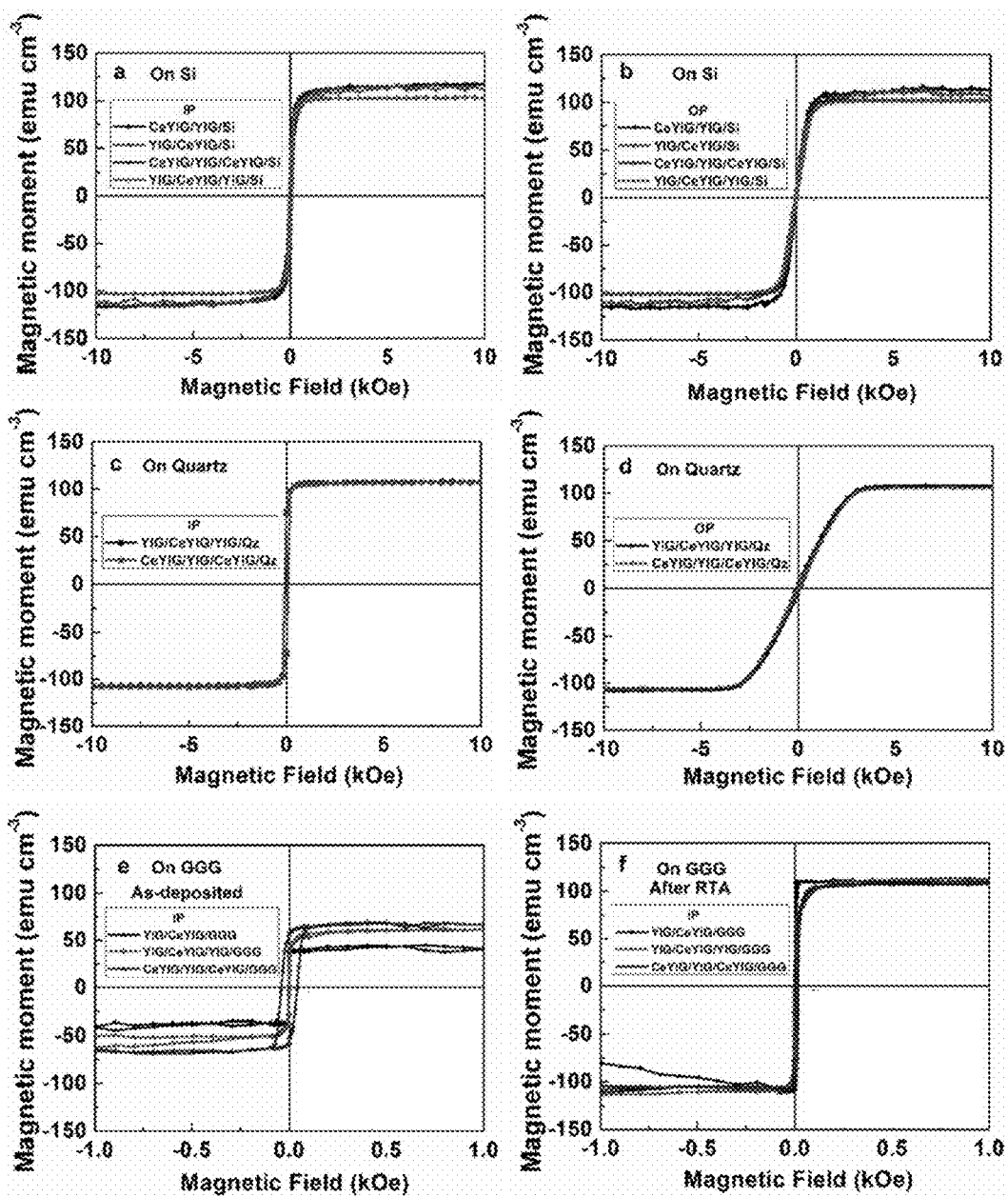
FIG. 11 shows plots of experimental magnetic properties of the magneto-optical films on the various substrates.

The saturation magnetization ($M_s$, averaged over all the garnet layers) of the films was 115 emu $cm^{-3}$ (with ~5% error estimate) for the Ce:YIG/YIG Si (see FIG. 11, plot a) and 113 emu $cm^{-3}$ for the YIG/CeYIG/Si (see FIG. 11, plot b). The $M_s$ of the three-layer films on Si was 103 emu $cm^{-3}$ (see FIG. 11, plot c); and the $M_s$ of the films on Qz was about 108 emu $cm^{-3}$ (see FIG. 11, plot d). As shown in FIG. 11, plot f, the $M_s$ of the films on GGG after RTA was 110 emu $cm^{-3}$, which is higher than the unannealed values reflected in the plot e of FIG. 11. These results are consistent with the samples being primarily garnet phase, without significant magnetite or maghemite spinel phases. The coercivity $H_c$ of single crystal multilayer films on GGG was <10 Oe, and it was a few times larger for films on Si.

For comparison, the bulk saturation magnetization at room temperature of YIG is about 140 emu $cm^{-3}$, and for Ce:YIG about 118 emu $cm^{-3}$, slightly higher than that of the films made in this study. The seed layer deposition conditions, in particular deposition rate, as well as the annealing temperature have an important effect on the magnetic properties, for example via their effect on oxygen content and cation ratios. It is expected that the $M_s$ could be increased by further optimization to be closer to bulk values.

The films all have high remanence in plane with an out of plane (OP) hard axis, but the magnitude of the net anisotropy differs between the films grown on different substrates. The net anisotropy can be estimated from the hard axis (i.e. the OP) saturation field, $H_K$ which was 1400 Oe for films on Si and 3500 Oe for films on Qz. The anisotropy $K_{TOT}$ consists of the sum of shape anisotropy (producing HK=$4\pi M_s$, in cgs units), magnetocrystalline and magnetoelastic contributions. For YIG, the shape anisotropy of $1.2\times10^5$ erg $cm^{-3}$ is the dominant factor leading to $H_K$=1760 Oe in unstrained polycrystalline YIG films with bulk $M_s$. The room temperature magnetocrystalline anisotropy is small (~$10^4$ erg $cm^{-3}$) and the magnetostriction coefficient is small, $\lambda_{100}$=-$1.3\times10^{-6}$.

The magnetocrystalline anisotropy of Ce:YIG is not well known, but will be neglected here due to the polycrystallinity of the Ce:YIG layers. The room temperature magnetostriction coefficient of $Ce_3Fe_5O_{12}$ (extrapolated from small concentrations of Ce) has been given as $\lambda_{100}$=+$120\times10^{-6}$ and $\lambda_{111}$=+$50\times10^{-6}$. Data on $Ce_xY_{1-x}Fe_5O_{12}$ in the range of x=0-0.125 also show that Ce contributed a positive magnetostriction, suggesting that the x=1 composition used here should have a positive magnetostriction. It may be extrapolated from earlier work that $\lambda_{100}$~+$10\times10^{-6}$ at x=1. Considering that the Ce:YIG occupies only about half the volume of the film, the effective magnetostriction of the film will be reduced from this value but is expected to still be positive. An estimate of the magnetoelastic anisotropy is (3/2) $\lambda_{100}E_{\epsilon_z}$, with $\epsilon_z$ representing the out of plane strain and E representing the Young's modulus, 200 GPa.

The in-plane thermal mismatch strain $\epsilon_x = -\epsilon_z/2$ is determined by the product of the difference in thermal expansion coefficients and the temperature change. For garnet films on Si the film will experience tensile strain after cooling from 800° C., with $\epsilon_x \sim 6 \times 10^{-3}$ (neglecting temperature dependence of the thermal expansion coefficients), whereas for films on crystalline quartz, with an in-plane thermal expansion coefficient of $13.7 \times 10^{-6}$ the films will experience compressive strain, $\epsilon_x \sim -8 \times 10^{-3}$. These thermal mismatch strains, combined with the positive magnetostriction, would suggest that the films on Qz would be easier to magnetize in the out-of-plane direction than those on Si, but the out-of-plane saturation field, $H_K$ was higher for the films on Qz, not lower. This suggests that the thermal mismatch may not be the only source of strain in the films, i.e. the films were not fully relaxed at the annealing temperature.

Figure 12:
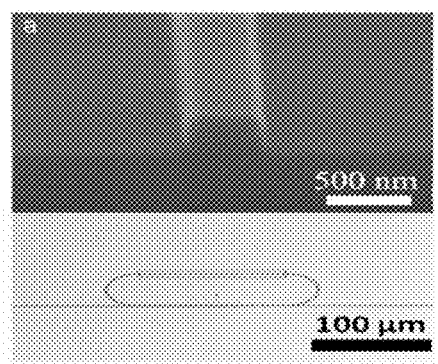
FIG. 12 shows a tilted view SEM micrograph of a silicon-on-insulator waveguide with optical isolator (top) and an optical micrograph of a racetrack resonator adjacent to the waveguide (bottom).

To quantify the magneto-optical behavior of the films in an integrated device, integrated optical isolator devices were fabricated by depositing YIG (30 nm)/CeYIG (60 nm) films on top of silicon-on-insulator racetrack resonators. FIG. 12 shows a tilted view SEM micrograph of a silicon-on-insulator waveguide with optical isolator (top) and an optical micrograph of a racetrack resonator adjacent to the waveguide (bottom). Prior to MO film deposition, the waveguide was coated with a 1 μm thick $SiO_2$ cladding and a window was subsequently opened in the cladding layer via wet etching. Therefore, only the waveguide section in the window region is in direct contact with the MO film and is magneto-optically active. The total length of the racetrack resonator was 682 μm, and the oxide window was 200 μm in length.

Figure 13:
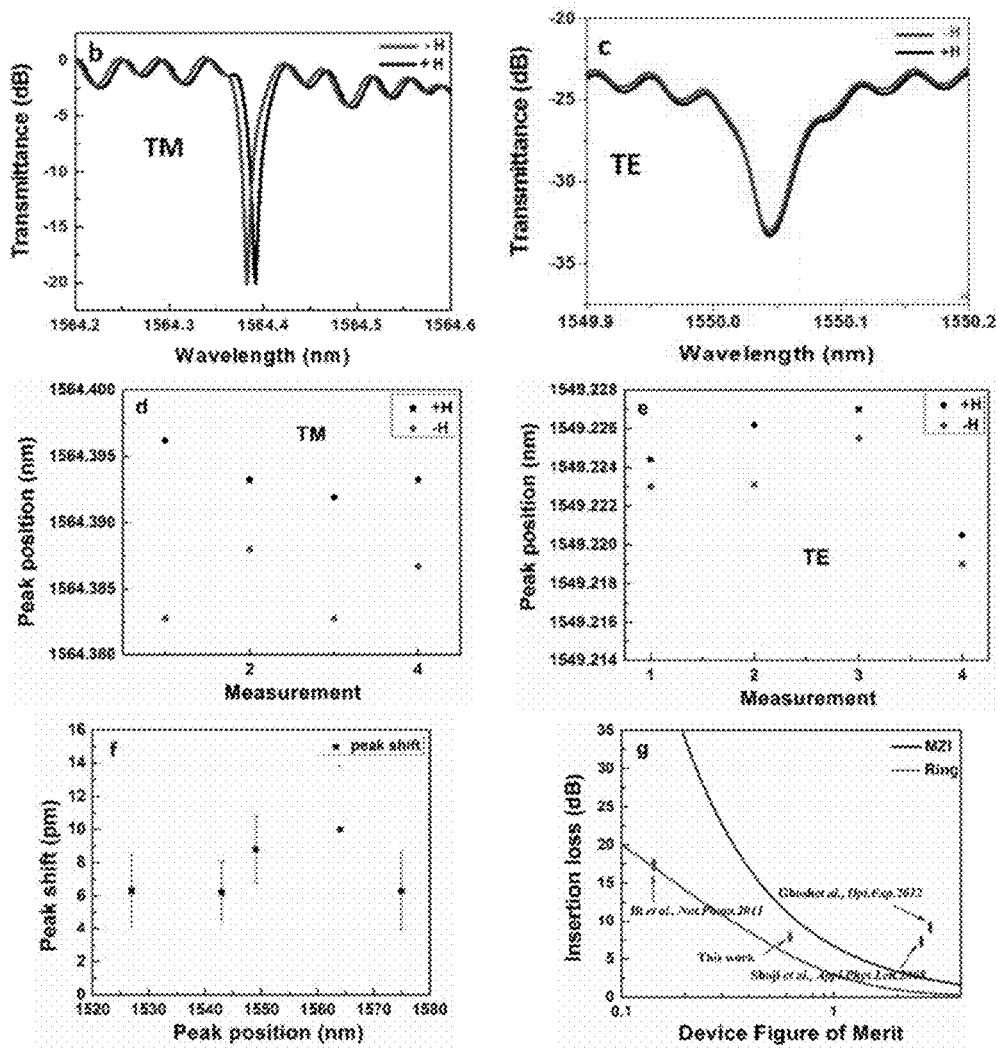
FIG. 13 shows various plots characterizing the optical isolator of FIG. 12.

FIG. 13 shows various plots characterizing the optical isolator of FIG. 12. In FIG. 13, plots a and b provide the transmission spectra of quasi-transverse magnetic (TM) and quasi-transverse electric (TE) modes through the isolator, respectively, measured for positive and negative magnetic fields applied in plane perpendicular to the garnet-clad section of the resonator. A resonant peak shift caused by non-reciprocal phase shift (NRPS) in the waveguide is clearly visible for the TM mode, whereas the TE mode exhibits negligible resonant peak shift, consistent with our magnetic field configuration. The device insertion loss is estimated to be 7.4 dB, and the isolation ratio is 13 dB. The Faraday rotation of the Ce:YIG film was estimated to be 1,100 degrees $cm^{-1}$ using perturbation theory.

The resonant wavelengths (TM mode resonant peak positions measured when the magnetic field direction was reversed ten consecutive times and TE mode resonant peak positions measured when the magnetic field direction was reversed eight consecutive times) obtained from the measurements are shown in FIG. 13, plots c and d, respectively. The average peak shift from four separate measurements is (9.6±4.1) pm for the TM mode and (1.7±0.4) pm for the TE mode. The small drift over repeated measurements at room temperature is likely a result of temperature change. FIG. 13, plot e shows the wavelength dependence of the non-reciprocal resonance shift.

To benchmark the performance of the device, simulation of the insertion losses of ideal isolator devices based on micro-ring resonator and Mach-Zehnder interferometer (MZI) geometries was performed, respectively. Insertion loss rather than isolation ratio was used as the performance benchmark, since it is directly correlated with the magneto-optical figure of merit of the non-reciprocal device, defined as:

$$FOM = \frac{\Delta\beta}{\alpha}$$

where $\Delta\beta$ denotes the nonreciprocal phase shift (NRPS), i.e. the propagation constant difference of forward and backward propagating modes in the waveguide, and $\alpha$ gives the waveguide loss. In contrast, isolation ratio is not an intrinsic parameter reflecting the magneto-optical figure of merit of the isolator devices, because it can be maximized by approaching the critical coupling condition in micro-rings, or tuning the power splitting ratio in two interferometer arms in the case of MZI.

The simulated insertion losses are plotted in FIG. 13, plot f, as solid lines, and the points denote the device insertion loss as well as values quoted from certain of the literature. The significant improvement of the device performance compared to earlier results is mainly attributed to reduced garnet material loss, it is anticipated that material processing improvement will further enhance the MO characteristics of deposited Ce:YIG films.

Polycrystalline magneto-optical two-layer and three-layer garnet films were grown on Si and quartz substrates using a "single-step" PLD method in which Ce:YIG/YIG bilayers and trilayers were grown and then annealed. Findings showed that YIG layers grown either above or below the Ce:YIG serve as effective seed layers to promote crystallization of the MO Ce:YIG layers. This avoids the need for a YIG layer between the waveguide and the Ce:YIG. Growth of the Ce:YIG directly in contact with the waveguide increases optical coupling into the Ce:YIG. The top-down crystallization of the Ce:YIG provides enhanced design options for nonreciprocal optical devices, and may be applicable in other materials systems where a seed layer is needed to ensure correct phase formation in a functional layer. The films were compared to single crystal films grown on GGG substrates and had similar magnetization. An integrated resonator optical isolator was fabricated on a Si waveguide showing an insertion loss of 7.4 dB and an isolation ratio of 13.0 dB at the 1520-1590 nm wavelength range, which represents significant performance improvement over previously demonstrated on-chip isolators.

It should be understood that the examples and embodiments described herein are for illustrative purposes only and that various modifications or changes in light thereof will be suggested to persons skilled in the art and are to be included within the spirit and purview of this application.

What is claimed is:

1. A method of fabricating integrated photonic devices comprising:
   depositing a functional garnet layer directly onto a non-garnet substrate;
   depositing a seed garnet layer on the functional garnet layer, the seed garnet layer having a characteristic in that the seed garnet layer crystallizes faster than the functional garnet layer; and
   after depositing both the functional garnet layer and the seed garnet layer, performing an annealing process to crystalize the functional garnet layer.

2. The method of claim 1, wherein depositing the functional garnet layer and depositing the seed garnet layer each comprises performing physical layer deposition.

3. The method of claim 1, further comprising:
   depositing a second functional garnet layer on the seed garnet layer before performing the annealing process.

4. The method of claim 3, further comprising:
depositing a second seed garnet layer on the second functional garnet layer before performing the annealing process.

5. The method of claim 1, further comprising, before performing the annealing process, alternatingly depositing additional layers of functional garnet and seed garnet until a desired functional garnet thickness is attained.

6. The method of claim 1, further comprising providing the non-garnet substrate.

7. The method of claim 6, wherein providing the non-garnet substrate comprises providing a waveguide on which the functional garnet layer is deposited.

8. The method of claim 1, wherein the seed garnet layer comprises a rare-earth garnet; and the functional garnet layer comprises a rare-earth substituted garnet.

9. A photonic integrated circuit (IC) comprising:
a non-garnet substrate; and
an optical integrated component comprising:
   a functional garnet layer directly on the non-garnet substrate, and
   a seed garnet layer on the functional garnet layer.

10. The photonic IC of claim 9, wherein the non-garnet substrate comprises a waveguide to which the optical isolator is coupled.

11. The photonic IC of claim 9, further comprising a laser structure coupled to the optical isolator.

12. The photonic IC of claim 9, wherein the functional garnet layer comprises a rare-earth substituted garnet and the seed garnet layer comprises a rare-earth garnet.

13. The photonic IC of claim 9, wherein the functional garnet layer has a thickness between 30 nm and 1 µm.

14. The photonic IC of claim 9, wherein the non-garnet substrate comprises silicon or quartz.

15. The photonic IC of claim 9, wherein the non-garnet substrate comprises a III-V semiconductor.

16. The photonic IC of claim 9, wherein the optical integrated component further comprises an additional functional garnet layer on top of the seed garnet layer.

17. The photonic IC of claim 16, wherein the optical integrated component further comprises an additional seed garnet layer on top of the additional functional garnet layer.

18. The photonic IC of claim 9, further comprising one or more components selected from the group consisting of a laser, a waveguide, a photodetector, a filter, an amplifier, a splitter, a coupler, and an optical modulator.

* * * * *